US006231049B1

(12) United States Patent
Ridgway

(10) Patent No.: US 6,231,049 B1
(45) Date of Patent: *May 15, 2001

(54) COMPOSITE GASKET WITH LOAD STABILIZER RIB

(75) Inventor: Robert K. Ridgway, Cedar Rapids, IA (US)

(73) Assignee: Master Packing & Rubber Company, Cedar Rapids, IA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/711,076

(22) Filed: Sep. 9, 1996

Related U.S. Application Data

(63) Continuation of application No. 08/398,500, filed on Mar. 3, 1995, now abandoned.

(51) Int. Cl.[7] .................................................. F02F 11/00
(52) U.S. Cl. ........................ 277/595; 277/595; 277/594
(58) Field of Search ................................ 277/592, 593, 277/594, 595, 639, 627, 638, 652, FOR 248; 285/910, 917

(56) References Cited

U.S. PATENT DOCUMENTS

| 3,567,234 | * | 3/1971 | Skrycki | 277/595 |
| 4,140,323 | * | 2/1979 | Jacobs | 277/180 |
| 4,325,559 | * | 4/1982 | Czernik et al. | 277/592 |
| 4,351,534 | * | 9/1982 | McDowell | 277/592 |
| 4,397,472 | * | 8/1983 | Czernik | 277/180 |
| 4,471,968 | * | 9/1984 | Schlaupitz | 277/235 B |
| 4,721,315 | * | 1/1988 | Ueta | 277/595 |
| 4,743,421 | | 5/1988 | McDowell et al. | 264/129 |
| 4,830,698 | * | 5/1989 | DeCore et al. | 277/235 B |
| 4,861,046 | | 8/1989 | Udagawa | 277/235 |
| 5,092,613 | | 3/1992 | Udagawa | 277/235 |
| 5,149,110 | | 9/1992 | Inamura | 277/235 |
| 5,150,910 | | 9/1992 | Udagawa | 277/235 |
| 5,280,928 | * | 1/1994 | Ueta et al. | 277/595 |
| 5,421,594 | * | 6/1995 | Becerra | 277/235 A |
| 5,431,418 | * | 7/1995 | Hagiwara et al. | 277/592 |
| 5,549,307 | * | 8/1996 | Capretta et al. | 277/595 |
| 5,690,342 | * | 11/1997 | Tanaka et al. | 277/594 |
| 5,695,203 | * | 12/1997 | Udagawa | 277/595 |

FOREIGN PATENT DOCUMENTS

| 627581 | * | 12/1994 | (EP) | 277/FOR 248 |
| 58-200860 | * | 11/1983 | (JP) | 277/FOR 248 |
| 0125461 | * | 7/1985 | (JP) | 277/235 B |
| 0261757 | * | 11/1987 | (JP) | 277/235 B |
| 1079471 | * | 3/1989 | (JP) | 277/FOR 248 |
| 3134376 | * | 6/1991 | (JP) | 277/FOR 248 |

\* cited by examiner

Primary Examiner—Daniel G. DePumpo
(74) Attorney, Agent, or Firm—Patula & Associates P.C.

(57) ABSTRACT

A composite gasket comprising a metal flange having graphite sealing surfaces overlaid thereon, has load stabilizing ribs formed in the metal flange in the parallel sides not having bolt holes therein. The ribs provide a more even load distribution in the graphite sealing surfaces such that a more efficient and longer lasting seal is provided, particularly in mis-designed or misapplied applications.

5 Claims, 3 Drawing Sheets

COMPOSITE GASKET WITH LOAD STABILIZER RIB

This application is a continuation of parent application Ser. No. 08/398,500 which was filed on Mar. 3, 1995 and is now abandoned.

The invention relates generally to an improved gasket, and more specifically, a composite gasket with a novel load stabilizing rib therein.

BACKGROUND OF THE INVENTION

Gaskets are used in many different applications to seal a joint between two objects in fluid communication with each other. Typically, gaskets are generally plate-like members which outline the cross-section of the two objects and are compressed therebetween to effectuate a seal. However, often, gaskets are exposed to a wide variety of forces and temperatures which can cause the gaskets to fail. Further, it is not uncommon that uneven loads are applied at different locations of the gasket. Such uneven loads frequently cause failure of the gasket to seal which results in leaks, etc. Accordingly, there has always been the desire to enhance the sealability of a gasket.

There have been various efforts made to enhance the sealability of gaskets in the past. However, such efforts usually depend on the specific application or use of a particular gasket in a particular situation.

For example, the past various patents disclose various gaskets for use in engines, especially internal combustion engines. U.S. Pat. No. 5,150,910 to Udagawa discloses a gasket in which both a hard seal coating and a soft seal coating are applied to the main plate of the gasket to effectuate a seal. The hard seal coating is applied to the plate entirely around the hole to be sealed and is then covered by the soft seal.

U.S. Pat. No. 5,149,110 to Inamura discloses a metal gasket with fluid hole sealing services. The gasket contains circular bends which entirely surround the fluid holes and which are directly compressed to effectuate a seal therearound.

U.S. Pat. No. 5,092,613 to Udagawa discloses a steel laminate gasket which comprises three plates laminated with each other. The outer plates contain beads which are directly compressed to seal around the cylinder hole in an internal combustion engine.

U.S. Pat. No. 4,861,046 to Udagawa discloses a steel laminate gasket with two plates, each having a bead which surrounds the hole to be sealed. The steel laminate gasket is used for an internal combustion engine.

U.S. Pat. No. 4,743,421 issued to McDowell, et al. discloses a method of making a gasket having roller coated secondary seals. The gasket contains an embossment which surrounds an opening. The embossment is then roller coated with a sealant material which is cured to an improved seal.

None of the above-mentioned prior art patents disclose or suggest the use of a stabilizing rib disposed along one or more sides of a gasket which distribute a more even load around the gasket to achieve maximum compression in the sealing surfaces of the gasket. Accordingly, the present invention provides an inexpensive, easy to manufacture, composite gasket which, among other things, distributes an even load around the gasket to help achieve maximum compression and effectuate an improved seal. The present invention likewise prevents creepage or cold flow and supports further compression of the gasket material thereby allowing the seal to work, even where bolt torque is relaxed from operating conditions.

BRIEF SUMMARY OF THE INVENTION

The present invention comprises a composite gasket with a load stabilizing rib. The gasket comprises a four-sided metal flange with rounded corners. Two parallel sides of the flange include bolt holes at their respective ends and center. A graphite sealing surface is suitably attached around the inside perimeter of the metal flange, on both sides.

A load stabilizing rib is formed in the metal flange along the sides without the bolt holes. The rib could be along all four sides to ensure a greater seal by preventing the creeping of the gasket material. This stabilizing rib produces a more even load distribution in the graphite sealing surface by forcing down the rib and creating a mechanical force through the metal portion of the gasket, transferring force through the composite material, i.e. the graphite. As a result, the graphite sealing surface maintains an increased compression about the entire sealing surface, and achieves maximum compression of the graphite along the ribs. The improved seal resulting from the present invention allows the use of lower bolt torques to prevent bolt failure and eliminate high stressing or sheering forces on the bolts.

The stabilizing rib is designed to create a new force across the sides of the gasket that are missing center bolts. By collapsing the rib upon installation, the bolt torque is more evenly distributed along the side that was mis-designed without a center bolt. The rib acts as a lever, raising a mechanical force through the composite material and sealing the flanges. The present invention is also advantageous in mis-applied installations, where the design may have correct loading, but the components are improperly assembled or fastened.

Accordingly, it is the principle object of the present invention to provide an improved gasket.

It is a further object of the invention to increase sealability of a gasket.

It is also an object of the invention to provide a load stabilizing rib in a gasket.

It is an additional object of the invention to provide means for increasing compression in a composite exhaust gasket.

It is another object of the invention to provide an improved gasket that seals in mis-designed applications and under an uneven load and helps hold torque to the corner bolts.

It is yet another object of the invention to create and redistribute a new sealing force or load by using the bolt torque.

Numerous other advantages and features of the invention will become readily apparent from the detailed description of the preferred embodiment of the invention from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DETAILED DESCRIPTION OF THE PREFERRED EMBODIMENT OF THE PRESENT INVENTION

Figure 1:
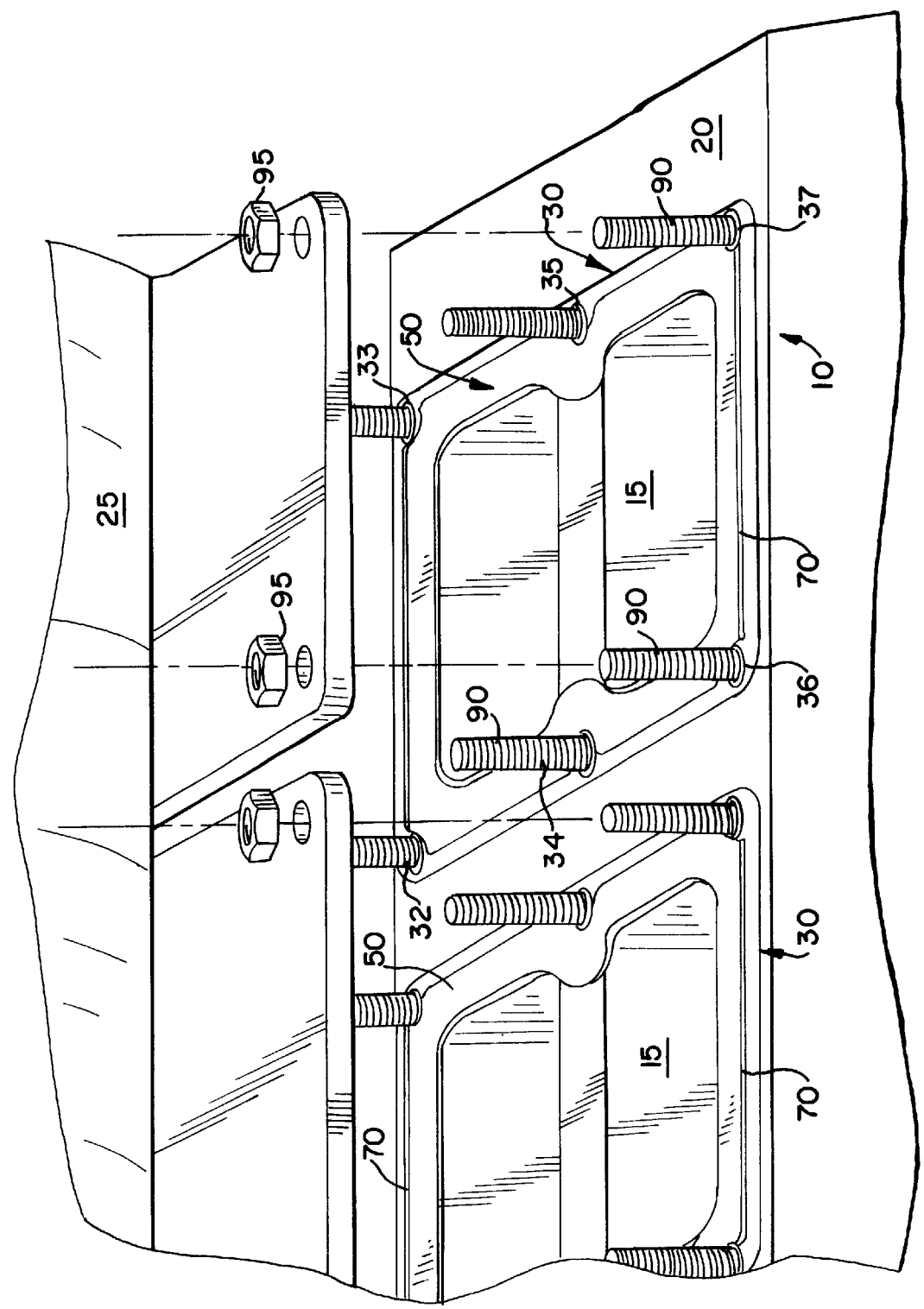
FIG. 1 is a perspective view of the preferred embodiment of the present invention in a suggested use in a locomotive exhaust stack.

While the present invention is susceptible of embodiment in many different forms, there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

FIGS. 1–6 illustrate the present invention or composite gasket 10 comprising a metal flange 30 having graphite sealing surfaces 50 overlaid thereon on both sides of the metal flange 30. The metal flange 30 has a rib 70 formed therein on two parallel sides, as will be explained in more detail later.

Referring now to FIG. 1, the composite gasket 10 is shown in position to form a seal around a passageway 15, for example only, in locomotive exhaust stack, where a first exhaust member 20 receives a second exhaust member 25. As can be seen, metal flange 30 includes a plurality of bolt receiving holes 32–37 which receive bolts 90 therethrough. Second exhaust member 25 is placed over gasket 10, whereupon a load is placed upon gasket 10 by the tightening of nuts 95 on bolts 90. The load on gasket 10 produces compression of the graphite sealing surfaces 50, thereby creating a seal.

Figure 2:
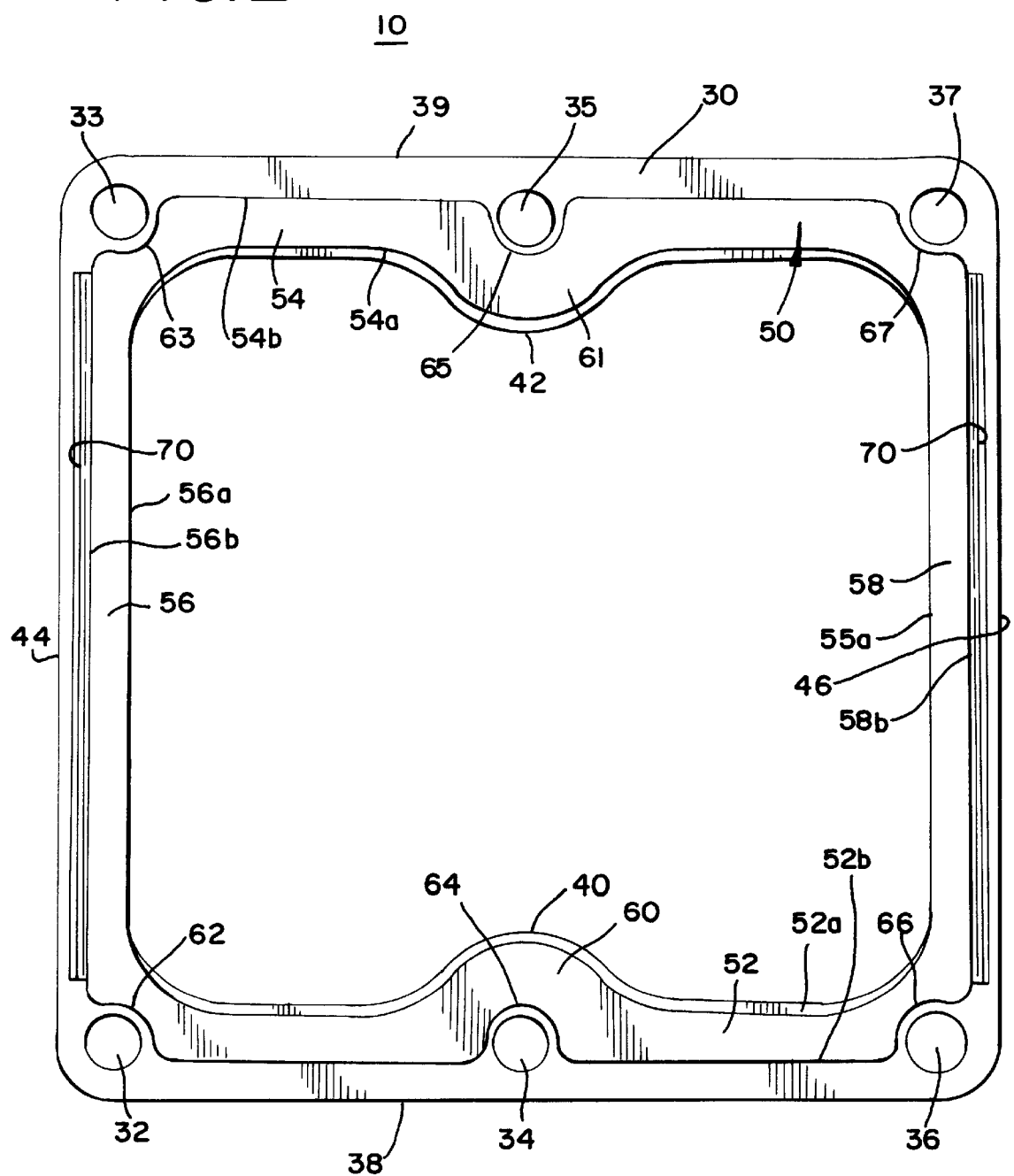
FIG. 2 is a top view of the present invention.

FIG. 2 is a top view of composite gasket 10. Metal flange 30 is depicted as being substantially square in configuration and having rounded corners. Bolt holes 32–37 are shown spaced equidistant from each other on parallel sides 38, 39. Holes 32, 33, 36 and 37 are corner holes while holes 34 and 35 are midpoint side holes. As can be seen, metal flange 30 has enlarged side portions 40, 42 at holes 34, 35 on sides 38 and 39, respectively. Enlarged side portions 40, 42 help strengthen metal flange 30 around holes 34, 35.

As is further shown, parallel sides 44 and 46 do not contain midpoint side holes. Sides 44 and 46 include longitudinal ribs 70 running substantially the entire length of the sides 44, 46. The width of sides 44, 46 is less than the width of sides 38, 39.

Graphite sealing surface 50 is shown overlaid on metal flange 30 and lays on an inner portion thereof. Graphite sealing surface 50 is substantially square, having sides 52, 54, 56, and 58. Inner edges 52a and 54a of sides 52 and 54, respectively, are slightly spaced from the inner edges of flange sides 40 and 42, respectively. However, inner edges 56a and 58a of sides 56 and 58, respectively, are even with the inner edges of flange sides 44 and 46, respectively. Outer edges 52b, 54b, 56b and 58b of sides 52, 54, 56, and 58, respectively, are spaced from the outer edges of metal flange 30, thereby leaving an outer portion of metal flange 30 uncovered by graphite. Outer edges 56b and 58b extend to and run parallel with ribs 70 in sides 44 and 46 of flange 30. Graphite sealing surface 50 also includes enlarged side portions 60 and 61, partially covering enlarged side portions 40, 42 of sides 38, 39 of metal flange 30. Additionally, graphite sealing surface 50 contains notches 62–67 for circumventing bolt holes 32-37, respectively.

Figure 3:
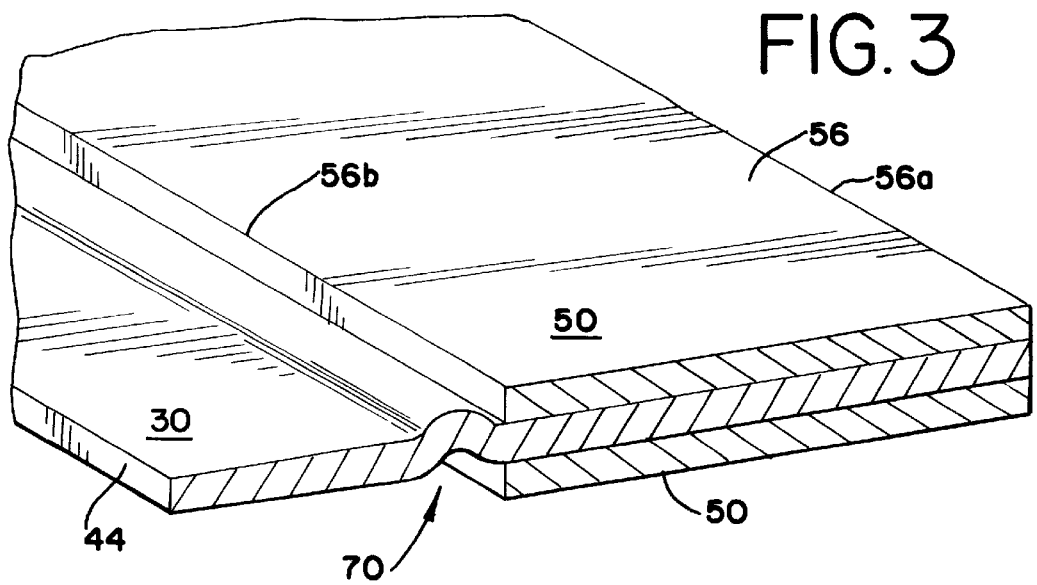
FIG. 3 is a partially broken away, cross-sectional perspective view of one side of the present invention embodying the stabilizing rib.

FIG. 3 shows a partially broken away, cross-sectional perspective view of one side of gasket 10 having a load stabilizing rib 70 therein, for example, side 44 of metal flange 30. As can be seen, graphite sealing surface 50 is applied to both the top and bottom of metal flange 30. It should be understood that each graphite sealing surface 50 is identical and like numerals are used to describe either.

As mentioned above, inner edge 56a of side 56 of graphite sealing surface 50 is even with the inner edge of side 44 of metal flange 30. Similarly, outer edge 56b of side 56 of graphite sealing surface 50 is even with rib 70 in side 44 of metal flange 30.

As can be seen in FIG. 3, rib 70 is a somewhat curved indentation formed in metal flange 30. Rib 70 should be V-shaped to serve the purpose of collapsing under torque in lever fashion to redistribute the load and to prevent the creeping or movement of the gasket material while under compression, etc.

Figure 4:
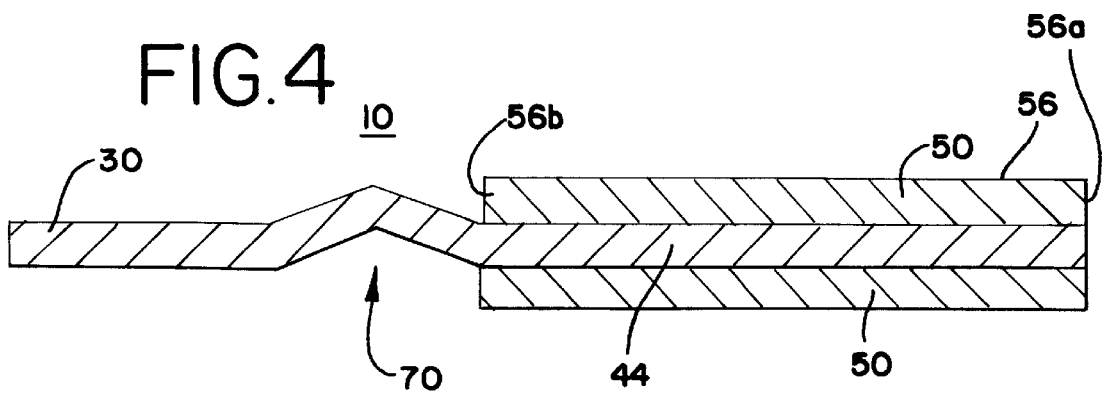
FIG. 4 is a cross-sectional view of a rib side of the present invention in a relaxed state.
Figure 5:
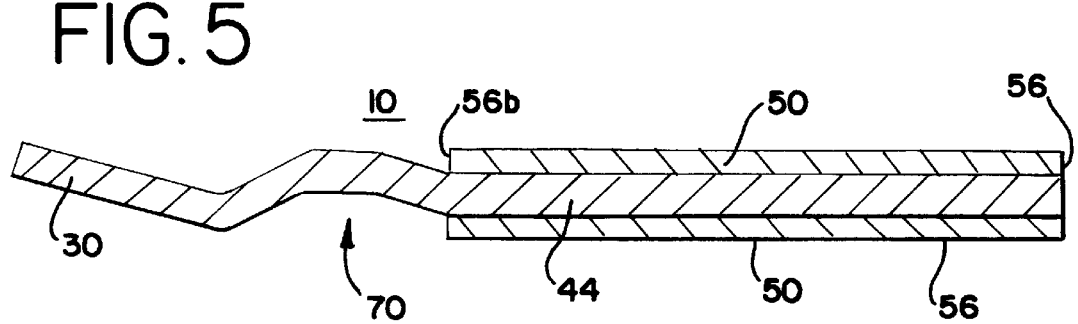
FIG. 5 is a cross-sectional view of a rib side of the present invention under partial compression.
Figure 6:
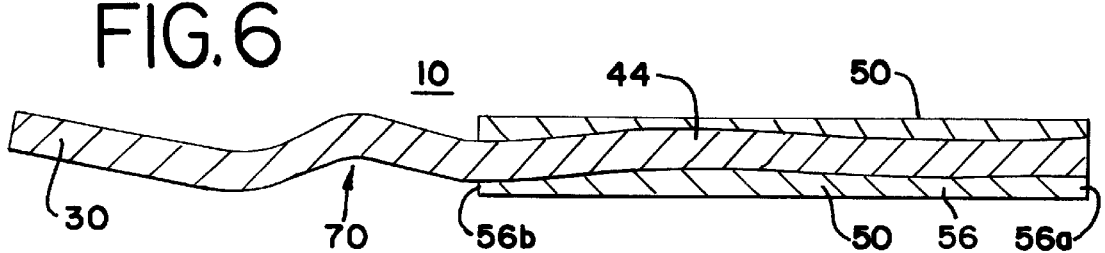
FIG. 6 is a cross-sectional view of a rib side of the present invention under total compression.

FIGS. 4–6, illustrate a cross-section of a side of invention 10 having a rib. Side 44 of metal flange 30 and side 56 of graphite sealing surface 50 are shown. Side 56 has inner edge 56a and outer edge 56b. Side 44 has load stabilizing rib 70 therein.

FIG. 4 shows gasket 10 in a relaxed state. There is no deformation of the generally V-shaped rib 70. There is no compression of the graphite sealing surfaces 50.

FIG. 5 shows gasket 10 under slight compression. Rib 70 begins to flatten, while the outer edge of side 44 is forced upward. Graphite sealing surfaces 50 are slightly compressed.

FIG. 6 shows gasket 10 under total compression. Rib 70 is flattened. Side 44 of metal flange 30 is distorted. The load stabilizing rib 70 causes the load to be distributed along graphite sealing surfaces 50 to achieve maximum compression.

In use, gasket 10 is positioned between two objects, for example first and second exhaust members 20 and 25, respectively. Bolt holes 32–37 receiving bolts 90 therethrough. A load is placed upon gasket 10 by the tightening of nuts 95 on bolts 90. As the load is applied, rib 70 of metal flange 30 is compressed and flattens. As a result, an upward mechanical force is created on the outer edge of metal flange 30. This mechanical force is transferred through the graphite sealing surface side 56, resulting in an increased compression about the entire sealing surface 50, and achieving maximum compression of the graphite along the ribs. The same process occurs along all sides of gasket 10 having a load stabilizing rib 70.

The gasket 10 is sufficiently deformable to allow even distribution of the bolt load as it is applied to the gasket. Load stabilizing rib 70 permits a slightly uneven load to be applied without the gasket 10 losing its seal. This is especially necessary in an application where torque wrenches cannot always be used because of the placement of several of the bolts. The load stabilizing ribs 70 further produce an additional mechanical force that will help hold torque to the four corner bolts that are subject to loosening due to vibration. The gasket 10 having ribs 70 will maintain a seal over a longer period of time than gasket without the ribs.

The metal flange 30 of the present invention 10 could be any suitable metal, but is preferably twenty-two (22) gauge carbon steel. Additionally, the flange is preferably laser cut to produce smooth edges. This will result in a dimensionally perfect, burr free flange that is easy and safe to handle.

The graphite sealing surfaces 50 are preferably a graphite known as CALGRAPH, manufactured by Polycarbon, Inc. of Valencia, Calif. Such graphite sealing surfaces are thermally stable and can operate in a temperature range from −400° F. to +5000° F. The graphite sealing surfaces are easily conformable to irregular and scratched surfaces and will not flow under excessive bolt loads.

Additionally, gasket 10 is preferably spray coated with commonly known graphite dry film. Such a coating helps prevent rusting of the metal flange and assists in easy removal of the gasket after service.

It is to be understood that the embodiments herein described are merely illustrative of the principles of the present invention. Various modifications may be made by those skilled in the art without departing from the spirit or scope of the claims which follow.

I claim:

1. A composite gasket for sealing a joint between two objects having cross-sections defining a passageway and in fluid communication with each other and connected together with nuts and bolts, said gasket comprising:

a single metal flange having a top surface, a bottom surface, a plurality of bolt holes, and a plurality of sides having an inner portion adjacent said passageway and an outer portion remote from said passageway; said sides configured to outline said cross-sections of said two objects;

a graphite sealing surface overlaid on said top surface and said bottom surface of said metal flange at said inner portion of said plurality of sides and around at least a portion of said plurality of bolt holes; and an indentation formed in said metal flange along substantially an entire length of at least one of said plurality of sides of said metal flange at said outer portion, remote from said passageway, and adjacent an outer edge of said graphite sealing surface relative to said passageway, said indentation creating a mechanical force upon compression of said gasket which distributes a load from the indentation towards said passageway and into said graphite sealing surface, said indentation further providing for holding of torque around said plurality of bolt holes.

2. The gasket of claim 1, wherein said indentation is a V-shaped rib.

3. A method of making a gasket with improved sealability comprising the steps of:

providing a metal flange having a top surface, a bottom surface, a plurality of bolt holes, and having a plurality of sides having an inner portion and an outer portion, said inner portion having a perimeter defining at least one passageway, wherein said inner portion is adjacent said passageway and said outer portion is remote from said passageway;

overlaying said inner portion of said top surface and said bottom surface with a composite material, said composite material extending around at least a portion of said plurality of bolt holes; and forming an indentation in said outer portion of said metal flange along substantially an entire length of at least one of said plurality of sides, adjacent to an outer edge of said composite material relative to said passageway; and wherein upon compression of said gasket, said indentation creates a mechanical force that distributes a load from said indentation towards said passageway and into said composite material, said indentation further providing for holding of torque around said plurality of bolt holes.

4. The method of claim 3, wherein said composite material is graphite.

5. The method of claim 3, wherein said indentation is a V-shaped rib.

* * * * *